United States Patent [19]

Jones

[11] Patent Number: 4,645,093

[45] Date of Patent: Feb. 24, 1987

[54] VENDING APPARATUS FOR VENDING INDIVIDUAL SERVINGS OF ICE CREAM

[75] Inventor: John R. Jones, Memphis, Tenn.

[73] Assignees: Richard F. Kriz, Cordova; Thomas Lemon, Memphis, both of Tenn.; Charles Thomas, Holly Springs, Miss.; part interest to each

[21] Appl. No.: 674,530

[22] Filed: Nov. 23, 1984

[51] Int. Cl.<sup>4</sup> .................. G07F 13/06; G07F 13/10
[52] U.S. Cl. .................................. 221/93; 221/96; 221/150 R; 222/146.6; 141/98; 141/104
[58] Field of Search ................ 221/93, 96, 92, 150 R; 222/146.6; 194/1 R, 2, 9 R, 10; 141/98, 101, 283, 250, 174, 369

[56] References Cited

U.S. PATENT DOCUMENTS

| | | | |
|---|---|---|---|
| 2,253,482 | 8/1941 | Forsthoefel et al. | 221/93 X |
| 2,385,465 | 9/1945 | Phelan | 221/93 X |
| 2,524,673 | 10/1950 | Martin | 221/150 R |
| 2,963,883 | 12/1960 | Teesdale | 221/150 R X |
| 3,075,480 | 1/1963 | Berg | 194/10 |
| 3,133,671 | 5/1964 | Christine et al. | 221/96 X |
| 3,587,918 | 6/1971 | Cornelius | 221/96 |
| 3,876,110 | 4/1975 | Logie | 222/80 |
| 3,954,126 | 5/1976 | Piana | 141/174 X |
| 4,009,740 | 3/1977 | Michielli | 141/174 X |
| 4,174,742 | 11/1979 | Murphey | 141/174 X |
| 4,232,798 | 11/1980 | Hammel et al. | 221/96 X |
| 4,276,750 | 7/1981 | Kawasumi | 221/96 X |

Primary Examiner—Joseph J. Rolla
Assistant Examiner—Edward S. Ammeen
Attorney, Agent, or Firm—Walker & McKenzie

[57] ABSTRACT

An apparatus for vending individual servings of ice cream at the demand and selection of a vendee. The apparatus includes a money activate switch for being closed when a predetermined amount of money is inserted thereinto; a selector switch for being energized when the money activated switch is closed; a container dispenser for dispensing one ice cream container when the selector switch is energized and one of a plurality of specific selection switches of the selector switch is closed; a container rotator for receiving the ice cream container from the container dispenser and for rotating the ice cream container; and an ice cream dispenser for dispensing ice cream into the ice cream container as the container is rotated by the container rotator. A syrup dispenser is preferably provided for selectively dispensing syrup onto the ice cream dispensed into the container.

22 Claims, 18 Drawing Figures

VENDING APPARATUS FOR VENDING INDIVIDUAL SERVINGS OF ICE CREAM

BACKGROUND OF THE INVENTION

1. Field of the Invention

The present invention relates in general to a vending apparatus for vending individual servings of ice cream at the demand and selection of a vendee.

2. Description of the Prior Art

Heretofore, various vending machines and the like have been developed. See, for example, Teesdale, U.S. Pat. Nos. 2,963,883; Christine, 3,133,671; Logie, 3,876,110; and Hammel et al, 4,232,798. None of the above patents disclose or suggest the present invention.

An ice cream sundae typically consists of a portion of ice cream served in a container with a topping of syrup, nuts or the like. Presently, the normal method of preparing an ice cream sundae is to manually hold the container beneath the discharge nozzle of an ice cream dispensing means or otherwise manually fill the container with ice cream, and then to manually apply the desired topping thereto.

SUMMARY OF THE INVENTION

The present invention is directed toward providing a self-contained, coin or money operated vending apparatus for vending individual servings of ice cream.

The vending apparatus of the present invention comprises, in general, a money activated switch means for being closed when the vendee inserts a predetermined amount of money thereinto; a selector switch means for being energized when the money activated switch means is closed, the selector switch means including a plurality of specific selection switch means for allowing the vendee to select one of a plurality of specific selections when the selector switch means is activated by manually closing one of the specific selection switch means; container dispenser means for dispensing one ice cream container when the selector switch means is energized and one of the specific selection switch means is closed; container rotator means for receiving the ice cream container after it is dispensed and for rotating the ice cream container when the selector switch means is energized and one of the specific selection switch means is closed; and ice cream dispenser means for dispensing ice cream into the ice cream container as the ice cream container is rotated by the container rotator means when the selector switch means is energized and when one of the specific selection switch means is closed.

DESCRIPTION OF THE PREFERRED EMBODIMENT

The vending apparatus 11 of the present invention is for vending individual servings of ice cream at the demand and selection of a vendee. The apparatus 11 includes a housing member 13 for containing the various components thereof and giving the apparatus 11 the general configuration of a typical soft drink dispensing machine or the like (see, in general, FIG. 1). An electrical cord 15 preferably extends from the housing member 13 and includes a male plug 17 for connection to a typical female electrical outlet for providing electrical energy to the apparatus 11 for reasons which will hereinafter become apparent.

Figures 1, 2:
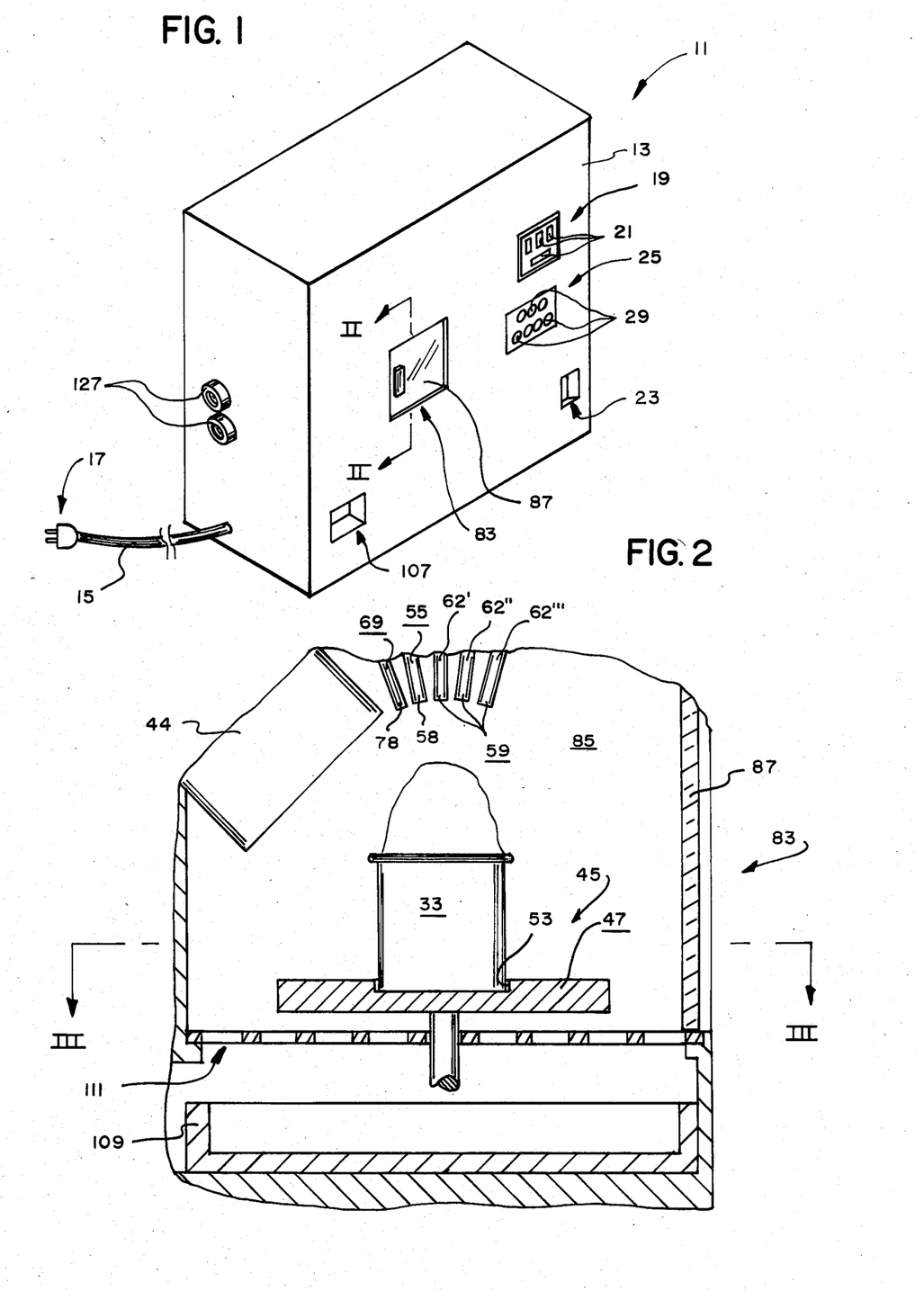
FIG. 1 is a perspective view of the vending apparatus of the present invention.
FIG. 2 is an enlarged sectional view substantially as taken on line II—II of FIG. 1.
Figure 11:
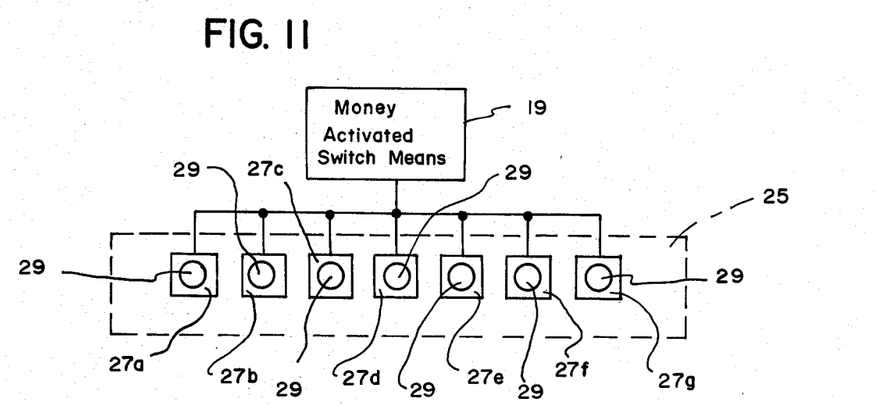
FIGS. 11-18 are somewhat diagrammatic views showing the relation and arrangement between certain components thereof.

The apparatus 11 includes a money activated switch means 19 for being closed when the vendee inserts a predetermined amount of money thereinto (see, in general, FIGS. 1 and 11). The money activated switch means 19 may be of any typical construction well known to those skilled in the art. Thus, the money activated switch means 19 preferably includes various money receiving slots 21 in the housing member 13 for allowing the vendee to insert money thereinto, and preferably includes the typical money return/change mechanism including a receptacle 23 for the money being returned (see, in general, FIG. 1). A typical vault or the like (not shown) is preferably provided within the housing member 13 for receiving and safely containing the money inserted in the slots 21.

The apparatus 11 includes a selector switch means 25 for being energized when the money activated switch means 19 is closed (see, in general, FIGS. 1 and 11). The selector switch means 25 includes a plurality of specific selection switch means 27 for allowing the vendee to select one of a plurality of specific selections when the selector switch means 25 is activated by manually closing one of the specific selection switch means 27 (see FIG. 11). The selector switch means 25 and specific selection switch means 27 may be of any typical construction well known to those skilled in the art. Thus, each specific selection switch means 27 may be controlled by a typical push button member 29 provided on the housing member 13 (see FIG. 1). The apparatus 11 may include, for example, seven specific selection switch means 27a, 27b, 27c, 27d, 27e, 27f, 27g (see FIG. 11) and seven push button members 29 for activating a respective one of the specific selection switch means 27. The specific selections may, of course, vary. For example, the apparatus 11 may include a first selection of ice cream only selectable by switch means 27a; a second selection of ice cream and chocolate syrup selectable by switch means 27b; a third selection of ice cream and strawberry syrup selectable by switch means 27c; a fourth selection of ice cream and caramel syrup selectable by switch means 27d; a fifth selection of ice cream, chocolate syrup and nuts selectable by switch means 27e; a sixth selection of ice cream, strawberry syrup and nuts selectable by switch means 27f; and a seventh selection of ice cream, caramel syrup and nuts selectable by switch means 27g.

Figure 10:
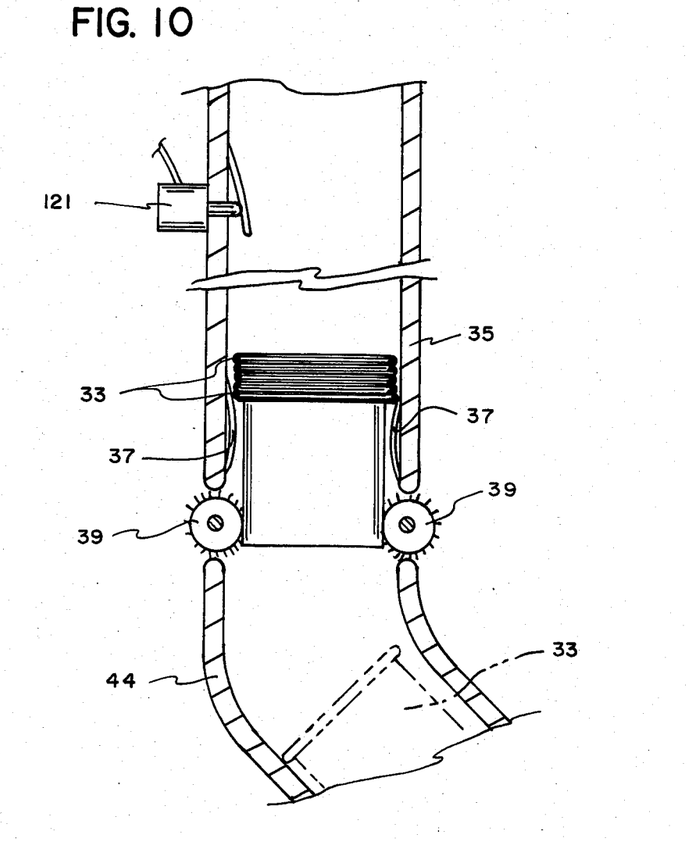
FIG. 10 is an enlarged sectional view of certain internal components thereof, showing portions of the container dispenser means thereof.
Figure 15:
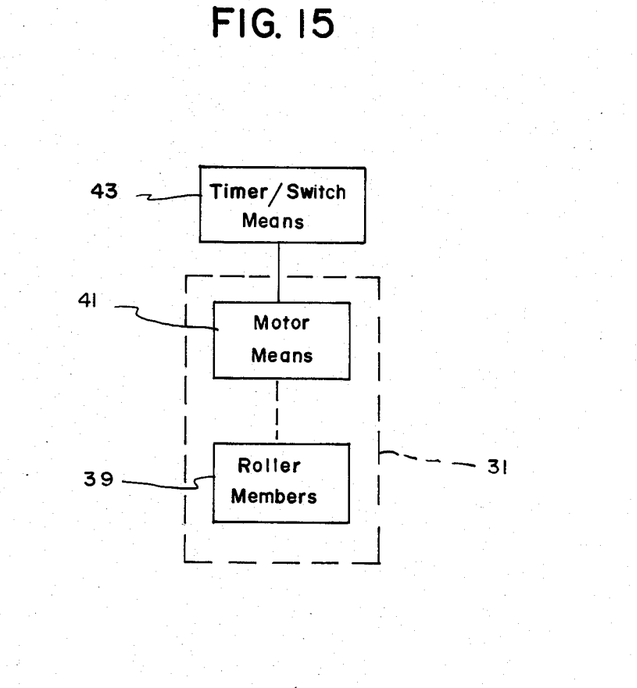

The apparatus 11 includes a container dispenser means 31 for dispensing one ice cream container 33 when the selector switch means 25 is energized and one of the specific selection switch means 27 is closed (see FIGS. 2, 10 and 15). The ice cream container 33 may consist of any typical cup or the like and preferably consists of a well known Styrofoam cup or the like. The container dispenser means 31 preferably includes a tube member 35 for holding a plurality of the ice cream containers 33. At least one and preferably a pair of inwardly directed, opposed lip members 37 are preferably provided adjacent the lower end of the tube member 35 for engaging the sides of the lower most one of the ice cream container 33 in the tube member 35 and for preventing the ice cream containers 33 from freely passing out the lower end of the tube member 35. At least one and preferably a pair of roller members 39 are provided substantially adjacent the lower end of the tube member 35 for frictionally engaging the sides of the lower most one of the ice cream containers 33 in the tube member 35 to pull or force the lower most one of the ice cream containers 33 past the lip members 37 and out of the tube member 35. A motor means 41 is preferably provided for rotating the roller members 39 when the selector switch means 25 is energized and one of the specific selection switch means 27 is closed to thereby cause one of the ice cream containers 33 to be dispensed to a rotator which will hereinafter become apparent. A timer/switch means 43 is preferably provided for activating the motor means 41 a predetermined period of time whereby only one container 33 will be dispensed each time the selector switch means 25 is energized. The means 43 is electrically coupled to all of the switch means 27. The motor means 41 and timer/switch means 43 are of any typical construction well known to those skilled in the art. The container 33 may pass into a conveyor chute 44 from the tube 35 for being directed to a specific location as herebelow described.

Figure 3:
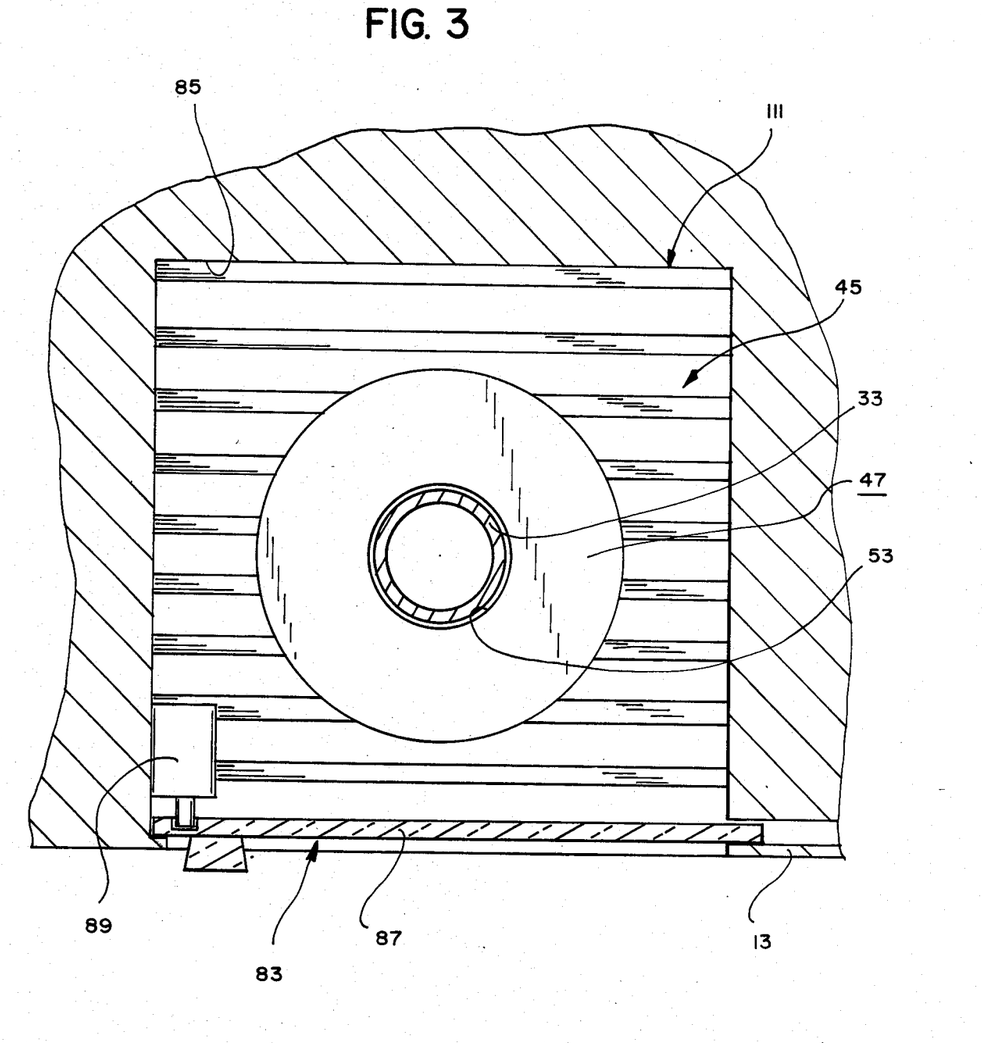
FIG. 3 is a sectional view substantially as taken on line III—III of FIG. 2.
Figure 14:
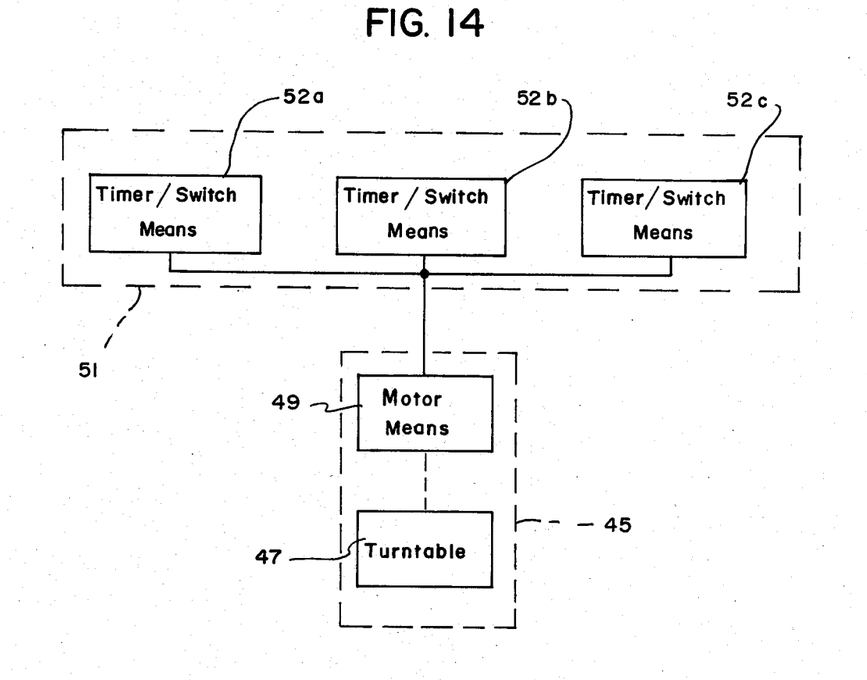

The apparatus 11 includes container rotator means 45 for receiving the ice cream container 33 after the container 33 is dispensed by way of the container dispenser means 31 and for rotating the container 33 when the selector switch means 25 is energized and one of the specific selection switch means 27 is closed (see FIGS. 2, 3 and 14). The container rotator means 45 preferably includes a turntable 47 for receiving and supporting the ice cream container 33 after the container 33 is dispensed from the tube member 35 and through the chute 44, and a motor means 49 for rotating the turntable 47 when the selector switch means 25 is energized and one of the specific switch means 27 is closed. A timer/switch means 51 (see FIG. 14) is preferably associated with the motor means 49 and for activating the motor means 49 a predetermined period of time. The timer/switch means 51 may include three specific timer/swtich means 52a, 52b, 52c (see FIG. 14) to activate the motor means 49 for different predetermined periods of time, depending on which specific selection switch means 27 is closed. Thus, the means 52a is electrically coupled to the switch means 27a, the means 52b is electrically coupled to the switch means 27b, 27c, 27d, and the means 52c is electrically coupled to the switch means 27e, 27f, 27g. The turntable 47 preferably has a depression or cavity 53 therein for receiving the bottom of the ice cream container 33.

Figure 13:
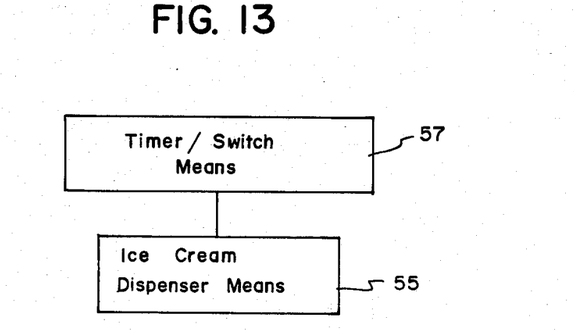

The apparatus 11 includes an ice cream dispenser means 55 for dispensing ice cream into the container 33 as the container 33 is rotated by the container rotator means 45 when the selector switch means 25 is energized and when one of the specific selection switch means 27 is closed (see FIGS. 2 and 13). The ice cream dispenser means 55 may be of various specific types well known to those skilled in the art such as the type manufactured by Taylor Freezer Company, 750 North Blackhawk Blvd., Rockton Ill. 61072. A timer/switch means 57 (see FIG. 13) is preferably associated with the ice cream dispenser means 55 for activating the ice cream dispenser means 55 for a predetermined period of time to thereby control the amount of ice cream dispensed thereby each time the selector switch means 25 is energized and one of the specific selector switch means 27 is closed. The means 57 is electrically coupled to all of the switch means 27. The dispenser means 55 typically includes a dispenser nozzle 58 or the like for directing the ice cream into the container 33 as shown in FIG. 2.

Figure 16:
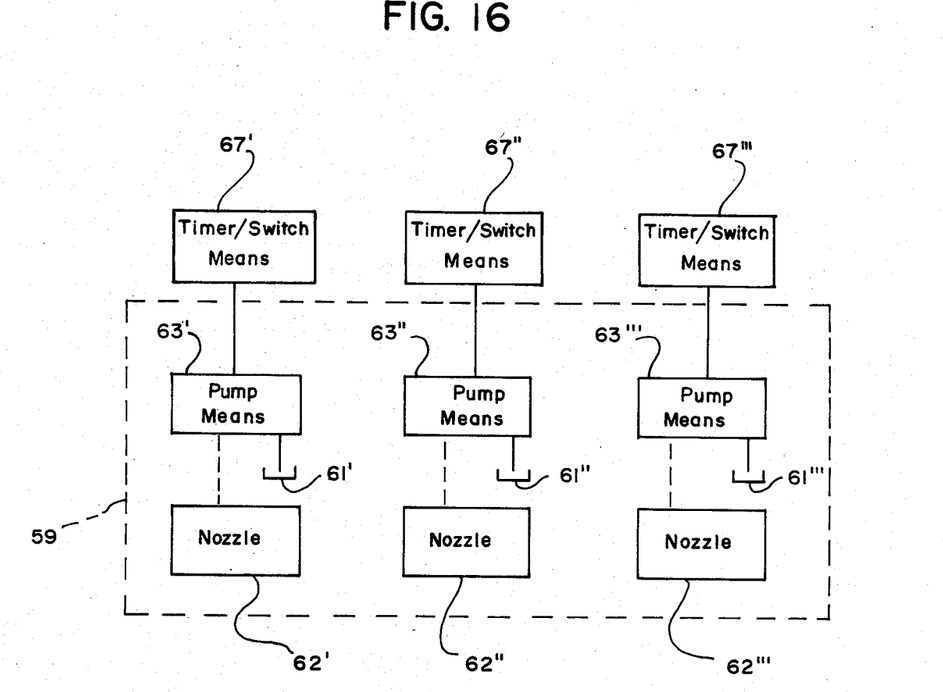
Figure 17:
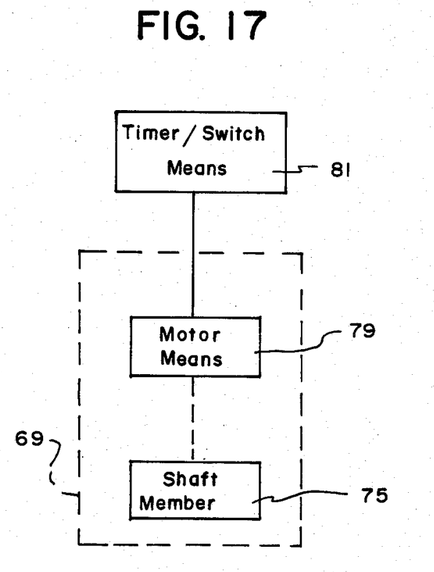

The apparatus 11 preferably includes a syrup dispenser means 59 for dispensing syrup onto the ice cream dispensed into the container 33 when the selector switch means 27 is energized and when one of the specific selection switch means 27 that calls for syrup is closed (see FIGS. 2 and 16). The syrup dispenser means 59 preferably includes a plurality of tank or reservoir members for holding different types of syrup. The dispenser means 59 may include a plurality of dispenser nozzles or the like for directing syrup onto the ice cream in the container 33. Thus, the syrup dispenser means 59 may include a first reservoir member 61' for holding chocolate syrup, a second reservoir member 61" for holding strawberry syrup, a third reservoir member 61'" for holding caramel syrup, a first nozzle 62' associated with the first reservoir member 61', a second nozzle 62" associated with the second reservoir member 61", and a third nozzle 62'" associated with the third reservoir member 61'" (see FIGS. 2 and 16). The syrup dispensing means 59 preferably includes a pump means for pumping syrup from each of the reservoir members 61', 61", 61'". Thus, the syrup dispensing means 59 may include a first pump means 63' associated with the first reservoir member 61' and first nozzle 62', a second pump means 63" associated with the second reservoir member 61" and second nozzle 62", and a third pump means 63'" associated with the third reservoir member 61'" and third nozzle 62'" (see FIG. 16). A timer/switch means is preferably associated with each pump means 63', 63", 63'" to activate a specific pump means 63', 63", 63'" for a predetermined period of time each time the selector switch means 25 is energized and a specific selection switch means 27 that calls for syrup is energized. Thus, the syrup dispensing means 59 may include a first timer/switch means 67' associated with the first reservoir member 61' and electrically coupled to the switch means 27b, 27e; a second timer/switch means 67" associated with the second reservoir member 61" and electrically coupled to the switch means 27c, 27f; and a third timer/switch means 67'" associated with the third reservoir member 61'" and electrically coupled to the switch means 27d, 27g (see FIG. 16). Appropriate valve means (not shown) may be associated with each reservoir member to control the flow therefrom A heater (not shown) of any typical construction may be associated with the reservoir members for heating the syrup held therein.

The apparatus 11 preferably includes a nut dispenser means 69 for dispensing nuts onto the ice cream dispensed into the container 33 by the ice cream dispenser means 55 when the selector switch means 25 is energized and one of the specific selection switch means 27 that calls for nuts is closed (see FIGS. 2, 6, 7 and 17). The nut dispenser means 69 preferably includes a container 71 for containing a quantity of chopped nuts or the like, the container 71 having a discharge opening 73 through which the nuts are dispensed. The nut dispenser means 69 also preferably includes a rotatable shaft member 75 for closing the discharge opening 73 of the container 71 to control the discharge of nuts therethrough. The shaft member 75 preferably has a pair of pockets 77 for receiving nuts from the discharge opening 73 of the container 71. The pockets 77 are disposed substantially 180° apart from one another as clearly shown in FIG. 7 whereby a half turn or rotation of the shaft member 75 will cause the contents of one pocket 77 to be dispensed. A dispenser chute or nozzle 78 may be located beneath the pockets 77 for directing the nuts onto the ice cream in the container 33 as shown in FIG. 2. The nut dispenser means 69 also includes a motor means 79 for rotating the shaft member 75 when the selector switch means 25 is energized and one of the specific selection switch means 27 that calls for nuts is closed. A timer/switch means 81 is associated with the motor means 79 for activating the motor means 79 for a predetermined period of time to thereby rotate the shaft member 75 exactly one-half turn for each cycle of the apparatus 11 (see FIG. 17). The means 81 is electrically coupled to the switch means 27e, 27f, 27g.

Figure 12:
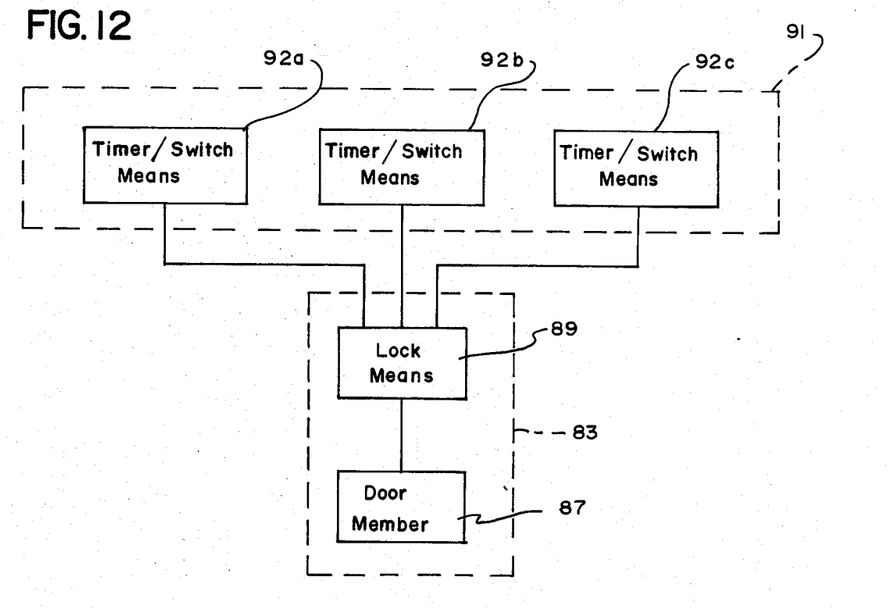

The apparatus 11 preferably includes a door means 83 for preventing access to the ice cream container 33 after the container 33 is dispensed and while the ice cream is being dispensed into the container, while syrup is being dispensed onto the ice cream, and/or while nuts are being dispensed onto the ice cream (see FIGS. 1,3 and 12). Thus, it will be noted that the turntable 47 of the container rotator means 45 is located within a recess portion 85 in the housing member 13 (see FIGS. 2 and 3) and the door means 83 preferably includes a door member 87 movable between a closed position in which access into the recess portion 85, and thus to the ice cream container 33, is prevented and an open position in which access thereto is allowed. The door member 87 may be of any typical construction well known to those skilled in the art and may slide or pivot open, etc. The door means 83 also preferably includes a lock means 89 for locking the door member 87 in the closed position. The lock means 89 may be of any typical construction now apparent to those skilled in the art such as a typical electro-mechanical solenoid activated mechanism. A timer/switch means 91 is associated with the lock means 89 (see FIG. 12) for activating the lock means 89 to lock the door member 87 in the closed position for a predetermined period of time. The timer/switch means 91 may include three specific timer/switch means 92a, 92b, 92c (see FIG. 12) to activate the lock means 89 for different predetermined periods of time, depending on which specific selection switch means 27 is closed. Thus, the means 92a is electrically coupled to the switch means 27a, the means 92b is electrically coupled to the switch means 27b, 27c, 27d, and the means 92c is electrically coupled to the switch means 27e, 27f, 27g.

Figure 8:
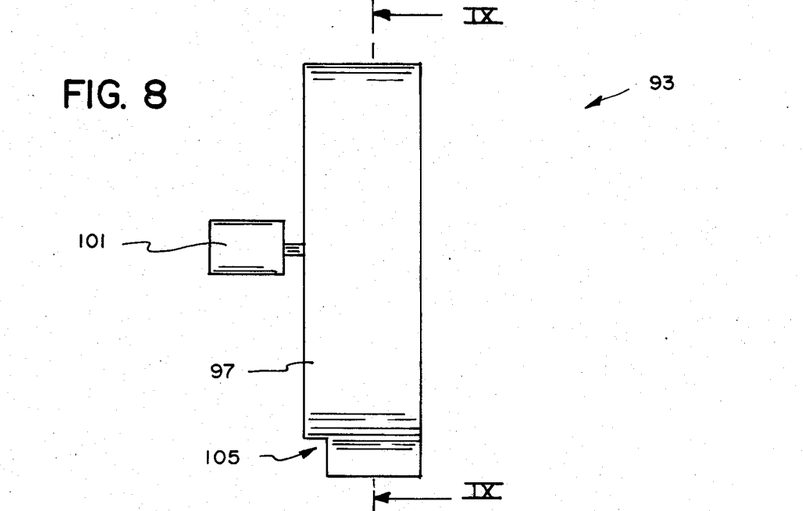
FIG. 8 is an elevational view of certain internal components thereof, showing the eating utensil dispenser means thereof.
Figure 9:
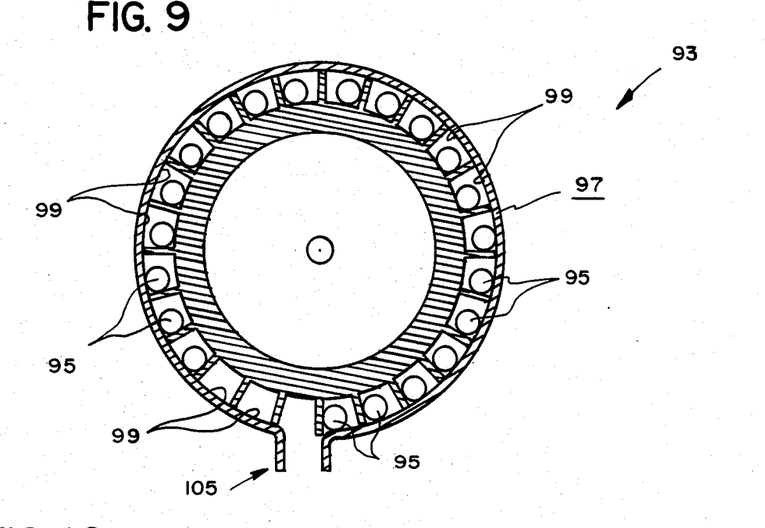
FIG. 9 is a sectional view substantially as taken on line IX—IX of FIG. 8.
Figure 18:
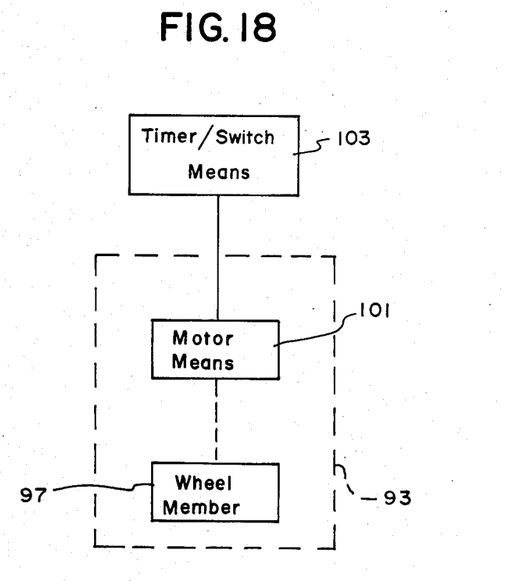

The apparatus 11 preferably includes an eating utensil dispenser means 93 for dispensing an eating utensil packet 95 when the selector switch means 25 is energized and one of the specific selection switch means 27 is closed (see FIGS. 8, 9 and 18). The eating utensil packet 95 preferably consists of a disposable, plastic spoon or the like wrapped within a paper napkin, etc. The eating utensil dispenser means 93 preferably includes a wheel member 97 having a plurality of pockets 99 therein, each of the pockets 99 being adapted to hole one eating utensil packet 95 (see FIGS. 8 and 9). The eating utensil dispenser means 93 also preferably includes a motor means 101 (see FIGS. 8 and 18) for causing the wheel member 97 to rotate when the selector switch means 25 is energized and one of the specific selection switch means 27 is closed. A timer/switch means 103 is preferably associated with the motor means 101 for activating the motor means 101 for a predetermined period of time to thereby control the amount of rotation of the wheel member 86 during each cycle of the apparatus 11. The means 103 is electrically coupled to all of the switch means 27. The eating utensil dispenser means 93 also preferably includes a discharge means 105 for causing one of the eating utensil packets 95 to be discharged from one of the pockets 99 of the wheel member 97 each time the wheel member 97 is caused to rotate. The construction and operation of such a dispenser means 93 is typical and apparent to those skilled in the art. The housing member 13 is provided with a typical receptacle portion 107 (see FIG. 1) for receiving the eating utensil packet 95 after it has been discharged from the wheel member 97 and to allow the vendee access thereto.

The apparatus 11 preferably includes a removable pan member 109 positioned within the recessed portion 85 and beneath the turntable 47 for receiving and containing any excess ice cream, syrup or nuts that is dispensed but not contained by the container 33 (see FIG. 2). A grate 111 is preferably positioned between the turntable 47 and the pan member 109 (see FIGS. 2 and 3).

Figure 4:
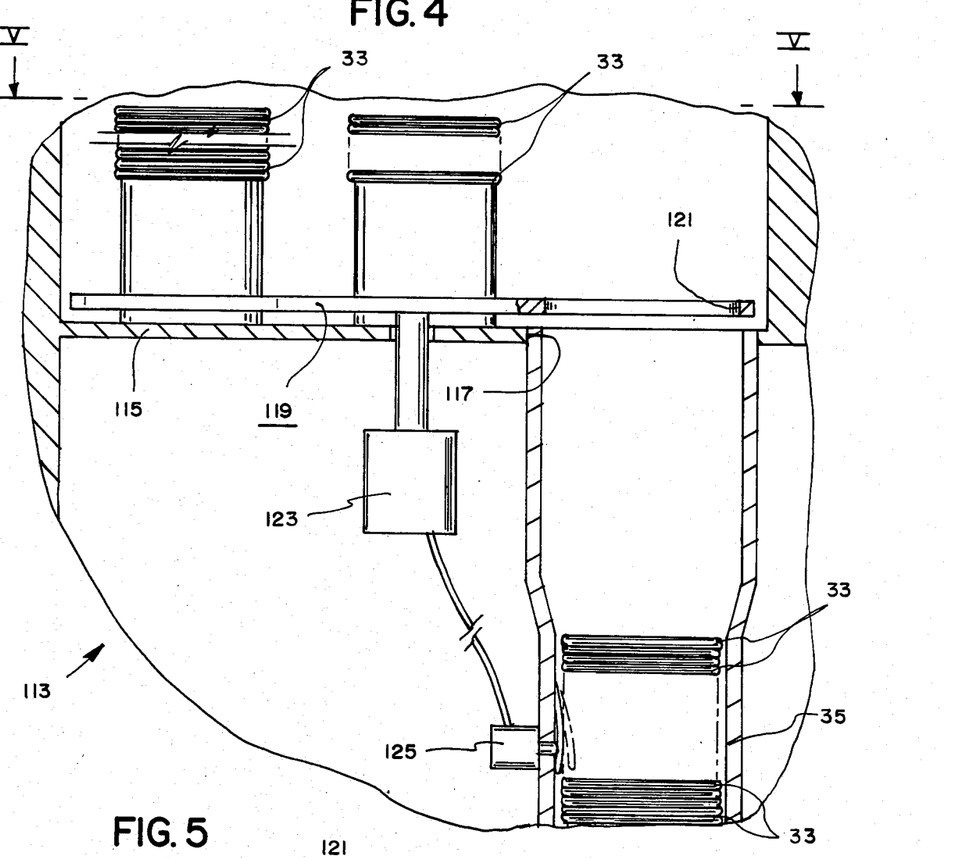
FIG. 4 is a sectional view of certain internal components thereof, showing the container refill means thereof.
Figure 5:
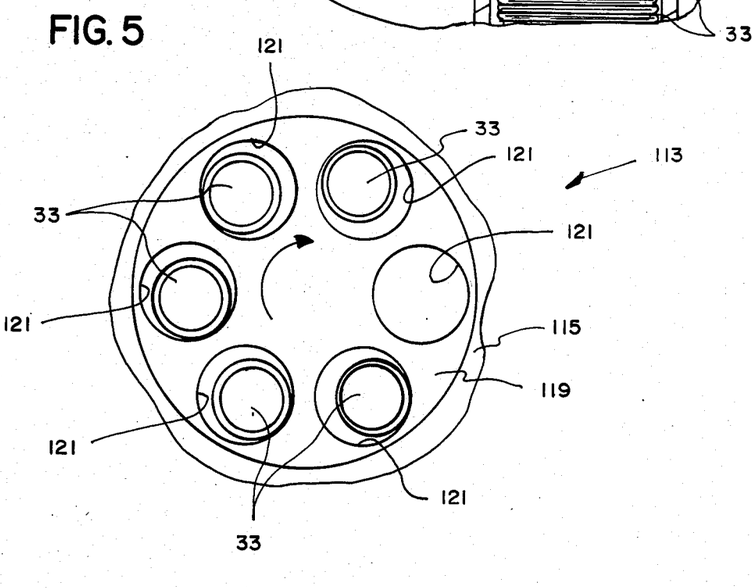
FIG. 5 is a reduced sectional view substantially as taken on line V—V of FIG. 4.
Figure 6:
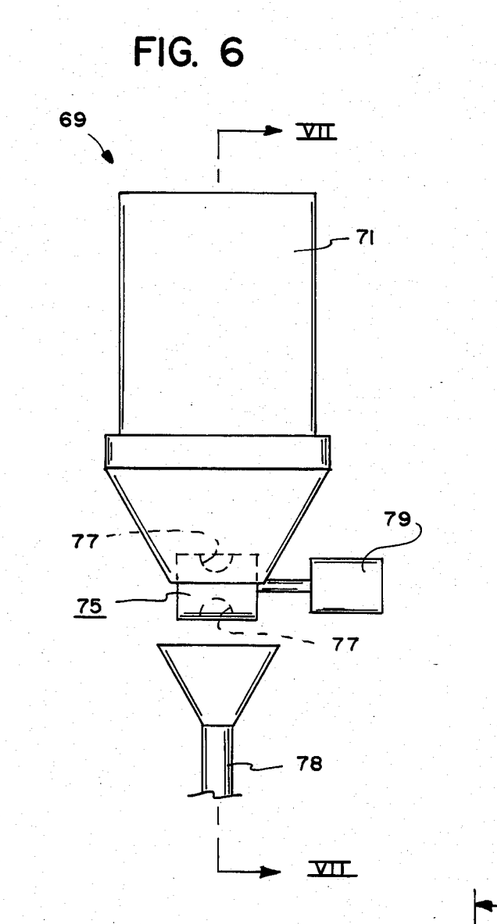
FIG. 6 is an elevational view of certain internal components thereof, showing the nut dispenser means thereof.
Figure 7:
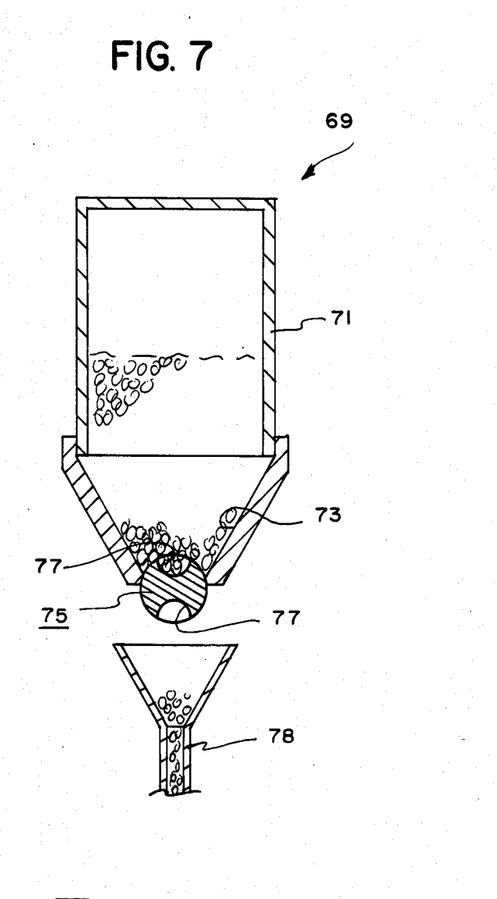
FIG. 7 is a sectional view substantially as taken on line VII—VII of FIG. 6.

The container dispenser means 33 may include a refill means 113 for refilling the tube member 35 with a plurality of the ice cream containers 33 (see FIGS. 4 and 5). The refill means 113 may include a platform member 115 fixedly mounted above the tube member 35 and having an aperture 117 therethrough located directly above the upper end of the tube member 35 with a diameter larger than the ice cream containers 33. The refill means 113 also may include a turntable member 119 rotatably mounted on the platform member 115 and having a plurality of apertures 121 therethrough, with each of the apertures 121 having a diameter larger than the diameter of the ice cream containers 33. A plurality of stacks of the ice cream containers 33 can then be positioned within each of the apertures 121 and supported on the platform member 115 whereby rotation of the turntable member 119 will cause the stacks of ice cream containers 33 to slide toward the aperture 117 in the platform member 115 whereupon the stack will fall by gravity into the tube member 33 in a manner as will now be apparent to those skilled in the art. The refill means 113 preferably includes a motor means 123 for rotating the turntable member 119 to cause one of the stacks of containers 33 to be moved over the aperture 117 through the platform member 115 and to fall through the aperture 117 into the tube member 35. A switch means 125 is associated with the motor means 123 for activating the motor means 123 when the supply of containers 33 in the tube member 35 drops below a certain quantity to cause the turntable member 119 to rotate until the supply of containers 33 in the tube member 35 is increased to or above that predetermined quantity.

The apparatus 11 may include various structure to allow a water hose or the like to be coupled thereto to allow various components of the apparatus 11 to be cleaned by way of pressurized water or the like. Thus, the housing member 13 may be provided with one or more female coupling members 127 (see FIG. 1) to allow a typical water hose or the like to be selectively coupled thereto.

The various electrical components are electrically coupled to one another by way of an electric circuit in a manner well known to those skilled in the art to cause the apparatus 11 to properly dispense the selected product. Thus, for example, the money activated switch means 19 may be electrically coupled to the electrical cord 15 whereby electrical power is supplied directly to the switch means 19. Each of the specific selection switch means 27 of the selector switch means 25 is electrically coupled to the switch means 19. Each specific selection switch means 27 is, in turn, electrically coupled to various specific ones of the timer/switch means to cause various dispensers and the like to be activated in proper sequence and for a predetermined period of time depending on the specific selection.

Insulation (not shown) is preferably provided throughout the interior of the housing member 13 at all appropriate places as will be apparent to those skilled in the art to reduce the transfer of heat therewithin, etc.

To use the apparatus 11, a vendee merely inserts money into the money receiving slots 21 of the money activated switch means 19 which will energize the selector switch means 25. The vendee then merely pushes one of the push button members 29 to close one of the specific selection switch means 27.

The various timer/switch means will then activate the various components in a predetermined sequence and for predetermined lengths of time to cause the door member 87 to be locked in the closed position, to cause the container dispenser means 31 to dispense one ice cream container 33, to cause the container rotator means 45 to rotate the container 33, to cause the ice cream dispenser means 55 to dispense a specific quantity of ice cream, to cause the eating utensil dispenser means 93 to dispense one eating utensil packet 95, and depending on the specific selection switch means 27 closed, perhaps causing the syrup dispenser means 59 to dispense a quantity of syrup and to cause the nut dispenser means 69 to dispense a quantity of nuts.

Although the present invention has been described and illustrated with respect to a preferred embodiment thereof and a preferred use therfor, it is not to be so limited since changes and modifications can be made therein which are within the full intended scope of the invention.

I claim:

1. Vending apparatus for vending individual servings of ice cream at the demand and selection of a vendee, said apparatus comprising:
   (a) money activated switch means for being closed when the vendee inserts a predetermined amount of money thereinto;
   (b) selector switch means for being energized when said money activated switch means is closed, said selector switch means including a plurality of specific selection switch means for allowing the vendee to select one of a plurality of specific selections when said selector switch means is activated by manually closing one of said specific selection switch means;
   (c) container dispenser means for dispensing one ice cream container when said selector switch means is energized and one of said specific selection switch means is closed;
   (d) container rotator means for receiving said ice cream container after said ice cream container is dispensed and for rotating said ice cream container when said selector switch means is energized and one of said specific selection switch means is closed;
   (e) ice cream dispenser means for dispensing ice cream into said ice cream container as said ice cream container is rotated by said container rotator means when said selector switch means is energized and one of said specific selection switch means is closed; and
   (f) syrup dispenser means for dispensing syrup onto the ice cream dispensed into said ice cream container after the ice cream is dispensed into said ice cream container, at least one of said specific selection switch means being connected to said syrup dispenser means, said syrup dispenser means dispensing syrup when said selector switch means is energized and said at least one of said specific selection switch means that is connected to said syrup dispenser means is closed.

2. The apparatus of claim 1 in which is included nut dispenser means for dispensing nuts onto the ice cream dispensed into said ice cream container after the ice cream is dispensed into said ice cream container, at least one of said specific selection switch means being connected to said nut dispenser means, said nut dispenser means dispensing nuts when said selector switch means is energized and said at least one of said specific selection switch means that is connected to said nut dispenser means is closed.

3. The apparatus of claim 2 in which is included door means for preventing access to said ice cream container after said ice cream is dispensed and while said ice cream dispenser is dispensing ice cream, while said syrup dispenser means is dispensing syrup, and/or while said nut dispenser means is dispensing nuts.

4. The apparatus of claim 3 in which is included eating utensil dispenser means for dispensing an eating utensil packet when said selector switch means is energized and one of said specific selection switch means is closed.

5. The apparatus of claim 4 in which said container dispenser means includes:
   (a) a tube member holding a plurality of said ice cream containers, said tube member having a lower end and an upper end;
   (b) at least one lip member attached to the interior of said tube member substantially adjacent said lower end thereof for preventing said ice cream containers from freely passing out said lower end of said tube member;
   (c) at least one roller member engaging one of said ice cream containers held in said tube member for selectively causing one of said ice cream containers to be discharged from said tube member; and (d) motor means for rotating said roller member when said selector switch means is energized and one of said specific selection switch means is closed.

6. The apparatus of claim 5 in which said container dispenser means includes refill means for refilling said tube member with a plurality of said ice cream containers.

7. The apparatus of claim 6 in which said refill means includes:
(a) a platform member fixedly mounted above said tube member and having an aperture therethrough located directly above said upper end of said tube member;
(b) a turntable member rotatably mounted on said platform member and having a plurality of apertures therethrough, a stack of said ice cream containers being held by said turntable member and said platform member in line with each of said apertures through said turntable member; and
(c) motor means for rotating said turntable member of said refill means to cause one of said stacks of said ice cream containers to be moved over said aperture through said platform member and to fall through said apertures in said turntable member and said platform member into said tube member.

8. The apparatus of claim 4 in which said syrup dispenser means includes:
(a) a plurality of reservoir members for holding different types of syrup;
(b) pump means for pumping syrup from said reservoir members; and
(c) valve means for coupling said pump means to a specific one of said reservoir members depending on which of said specific selection switch means that is connected to said syrup dispenser means is closed.

9. The apparatus of claim 8 in which said syrup dispenser means include heater means for heating the syrup in said reservoir members.

10. The apparatus of claim 4 in which said nut dispenser means includes:
(a) a container for holding a quantity of nuts, said container having a discharge opening through which said nuts are dispensed;
(b) a rotatable shaft member closing said discharge opening of said container, said shaft member having first and second pockets for receiving nuts from said discharge opening of said container, said pockets being disposed substantially 180° apart from one another; and
(c) motor means for rotating said shaft member when said selector switch means is energized and said at least one of said specific selection switch means that is connected to said nut dispenser means is closed.

11. The apparatus of claim 4 in which said eating utensil dispenser means includes:

(a) a wheel member having a plurality of pockets, each of said pockets holding one eating utensil packet;
(b) motor means for causing said wheel member to rotate when said selector switch means is energized and one of said specific selection switch means is closed; and
(c) discharge means for causing one of said eating utensil packets to be discharged from one of said pockets of said wheel members each time said wheel member is caused to rotate.

12. The apparatus of claim 4 in which said container rotator means includes:
(a) a turntable for supporting said ice cream container after said ice cream container is dispensed by said container dispenser means; and
(b) motor means for rotating said turntable when said selector switch means is energized and one of said specific switch means is closed.

13. The apparatus of claim 12 in which said turntable has a cavity for receiving the bottom of said ice cream container.

14. The apparatus of claim 12 in which is included a pan member for receiving and containing any of said ice cream, syrup or nuts that is dispensed but is not contained by said ice cream container.

15. The apparatus of claim 14 in which is included a grate member positioned between said turntable of said container rotator means and said pan member.

16. The apparatus of claim 4 in which said door means includes a door member movable between a closed position in which access to said ice cream container is prevented and an open position in which access to said ice cream container is allowed, and lock means for locking said door member in said closed position.

17. The apparatus of claim 5 in which is included timer/switch means for activating said motor means of said container dispenser means a predetermined period of time.

18. The apparatus of claim 8 in which is included timer/switch means for activating said pump means of said syrup dispenser means a predetermined period of time.

19. The apparatus of claim 10 in which is included timer/switch means for activating said motor means of said nut dispenser means a predetermined period of time.

20. The apparatus of claim 11 in which is included timer/switch means for activating said motor means of said eating utensil dispenser means a predetermined period of time.

21. The apparatus of claim 12 in which is included timer/switch means for activating said motor means of said container rotator means a predetermined period of time.

22. The apparatus of claim 16 in which is included timer/switch means for activating said lock means of said door means a predetermined period of time.

* * * * *